United States Patent
Tenny

(10) Patent No.: US 8,934,919 B2
(45) Date of Patent: Jan. 13, 2015

(54) METHOD AND APPARATUS FOR DETERMINING THE POSITION OF A BASE STATION IN A CELLULAR COMMUNICATION NETWORK

(75) Inventor: Nathan Edward Tenny, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 679 days.

(21) Appl. No.: 12/144,553

(22) Filed: Jun. 23, 2008

(65) Prior Publication Data

US 2008/0318596 A1  Dec. 25, 2008

Related U.S. Application Data

(60) Provisional application No. 60/945,498, filed on Jun. 21, 2007.

(51) Int. Cl.
*H04W 24/00* (2009.01)
*H04W 64/00* (2009.01)
*G01S 5/02* (2010.01)
*G01S 5/14* (2006.01)
*H04W 84/04* (2009.01)

(52) U.S. Cl.
CPC .............. *H04W 64/00* (2013.01); *G01S 5/0205* (2013.01); *G01S 5/0284* (2013.01); *G01S 5/14* (2013.01); *G01S 5/0242* (2013.01); *H04W 84/045* (2013.01)
USPC .......................... 455/456.1; 370/328; 710/313

(58) Field of Classification Search
CPC ....... H04W 64/00; H04W 4/02; H04W 84/12; H04W 84/18; H04W 80/04; H04L 29/08657
USPC ................ 455/456.2, 456.1; 370/338, 328; 710/313
See application file for complete search history.

(56) References Cited

U.S. PATENT DOCUMENTS 5,850,609 A * 12/1998 Sugarbroad et al. ....... 455/456.1
6,888,811 B2   5/2005 Eaton et al.
(Continued)

FOREIGN PATENT DOCUMENTS

EP   1289329 A1   3/2003
EP   1313270 A2   5/2003
(Continued)

OTHER PUBLICATIONS

International Search Report—PCT/US08/067946, International Search Authority—European Patent Office—Nov. 17, 2008.

(Continued)

*Primary Examiner* — William D Cumming

(57) ABSTRACT

Techniques for performing positioning in a cellular network are described. In one design, a first base station (e.g., a home base station) determines its position based on position information for at least one user equipment (UE) within radio coverage of the first base station and a second base station. The first base station sends at least one position request for the at least one UE to the second base station, receives position information for the at least one UE from the second base station, and determines a position estimate for itself based on the position information. In another design, the second base station receives a position request for the first base station, obtains position information for at least one UE, determines a position estimate for the first base station based on the position information, and sends the position estimate to the first base station.

29 Claims, 10 Drawing Sheets

(56) References Cited

U.S. PATENT DOCUMENTS

| | | | |
|---|---|---|---|
| 7,990,912 B2 * | 8/2011 | Nix et al. | 370/328 |
| 2002/0177460 A1 | 11/2002 | Beasley et al. | |
| 2003/0134657 A1 | 7/2003 | Norta et al. | |
| 2004/0002346 A1 | 1/2004 | Santhoff | |
| 2004/0009778 A1 | 1/2004 | Makuta | |
| 2004/0066759 A1 | 4/2004 | Molteni et al. | |
| 2004/0203914 A1 | 10/2004 | Kall et al. | |
| 2005/0043038 A1 | 2/2005 | Maanoja et al. | |
| 2005/0101331 A1 | 5/2005 | Tamaki et al. | |
| 2005/0213538 A1 | 9/2005 | Ebiko et al. | |
| 2006/0003710 A1 | 1/2006 | Nakagawa et al. | |
| 2006/0009235 A1 | 1/2006 | Sheynblat et al. | |
| 2006/0211431 A1 | 9/2006 | Mansour et al. | |
| 2007/0002813 A1 * | 1/2007 | Tenny et al. | 370/338 |
| 2007/0112948 A1 | 5/2007 | Uhlik | |
| 2007/0167147 A1 | 7/2007 | Krasner et al. | |
| 2008/0244148 A1 * | 10/2008 | Nix et al. | 710/313 |

FOREIGN PATENT DOCUMENTS

| | | |
|---|---|---|
| EP | 1469368 A1 | 10/2004 |
| JP | 2004088148 A | 3/2004 |
| JP | 2004128579 A | 4/2004 |
| JP | 2004266818 | 9/2004 |
| JP | 2005123833 A | 5/2005 |
| JP | 2009510972 A | 3/2009 |
| WO | 03010552 | 2/2003 |
| WO | WO2004064327 | 7/2004 |
| WO | WO-2007040452 A1 | 4/2007 |

OTHER PUBLICATIONS

Written Opinion—PCT/US08/067946, International Search Authority—European Patent Office—Nov. 17, 2008.

3GPP TR 25.820 v8.0.0 (Mar. 2008), entitled 3rd Generation Partnership Project; Technical Specification Group Radio Access Networks; 3G Home NodeB Study Item Technical Report (Release 8).

3GPP TS 36.300 v8.4.0 (Mar. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

Mitsubishi Electric, "Whereability of HNBs," R3-071237, 3GPP TSG SA WG5 and RAN WG3 LTE Adhoc, Sophia-Antipolis, France, Jun. 13-14, 2007, 4 pages.

* cited by examiner

METHOD AND APPARATUS FOR DETERMINING THE POSITION OF A BASE STATION IN A CELLULAR COMMUNICATION NETWORK

CLAIM OF PRIORITY UNDER 35 U.S.C. §119

The present application claims priority to provisional U.S. application Ser. No. 60/945,498, entitled "METHOD AND APPARATUS FOR DETERMINING POSITION OF HOME ACCESS POINTS," filed Jun. 21, 2007, assigned to the assignee hereof and incorporated herein by reference.

BACKGROUND

I. Field

The present disclosure relates generally to communication, and more specifically to techniques for performing positioning in a cellular communication network.

II. Background

It is often desirable, and sometimes necessary, to know the position of a user equipment (UE) in a cellular communication network. The terms "position" and "location" are synonymous and are used interchangeably herein. For example, a user may utilize the UE to browse through a website and may click on location sensitive content. The position of the UE may then be determined and used to provide appropriate content to the user. As another example, the user may place an emergency call using the UE. The position of the UE may then be determined and used to send emergency assistance to the user. There are many other scenarios in which knowledge of the position of the UE is useful or necessary.

The position of the UE may be estimated based on timing measurements for one or more base stations in the cellular network and/or known positions of the base stations. In some instances, a base station may not have capability to autonomously determine its position and/or the position of the base station may be unavailable through conventional means (e.g., surveying). It may be desirable to determine the position of the base station in such instances.

SUMMARY

Techniques for determining the position of a base station in a cellular communication network are described herein. In an aspect, a first base station may determine its position based on position information for at least one UE within radio coverage of the first base station and a second base station. A UE is within radio coverage of a base station if the UE can detect a signal from the base station and/or the base station can detect a signal from the UE. A UE may typically receive communication service from one base station even though the UE may be within radio coverage of multiple base stations. The first base station may be a home base station (BS) providing radio coverage for a femto-cell. The second base station may provide radio coverage for a macro-cell larger than (e.g., encompassing) the femto-cell.

In one design, the first base station may send at least one position request for at least one UE to the second base station. The first base station may identify one or more UEs in each position request or may send a list of the at least one UE to the second base station. The second base station may obtain position information for the at least one UE and may return the position information to the first base station. The first base station may then determine a position estimate for itself based on the position information.

In one design, the position information may comprise multiple position estimates for multiple UEs or multiple position estimates obtained at different times for a single mobile UE. The first base station may average the multiple position estimates for the single or multiple UEs to obtain the position estimate for itself. In another design, the first base station may obtain multiple round trip time (RTT) measurements for the at least one UE and may also obtain multiple position estimates for the at least one UE from the position information. The first base station may then determine the position estimate for itself based on the multiple RTT measurements and the multiple position estimates for the at least one UE, e.g., using trilateration.

In another aspect, the second base station may determine the position estimate for the first base station. In one design, the second base station may receive a position request for the first base station and may obtain position information for at least one UE. The second base station may then determine the position estimate for the first base station based on the position information for the at least one UE, e.g., using averaging or trilateration. The second base station may then send this position estimate to the first base station.

The techniques described herein may be particularly advantageous in determining the position of a home base station, which may be moved without a network operator's direct knowledge. The position of the home base station may be used as a position estimate for a UE in an emergency call scenario (e.g., to meet requirements of the Communications Assistance for Law Enforcement Act) and also in cases where the UE is not able to use its positioning capabilities (e.g., GPS not working well indoors).

Various aspects and features of the disclosure are described in further detail below.

DETAILED DESCRIPTION

The techniques described herein may be used for various cellular communication networks such as Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM), Digital Advanced Mobile Phone System (D-AMPS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE.

Figure 1:
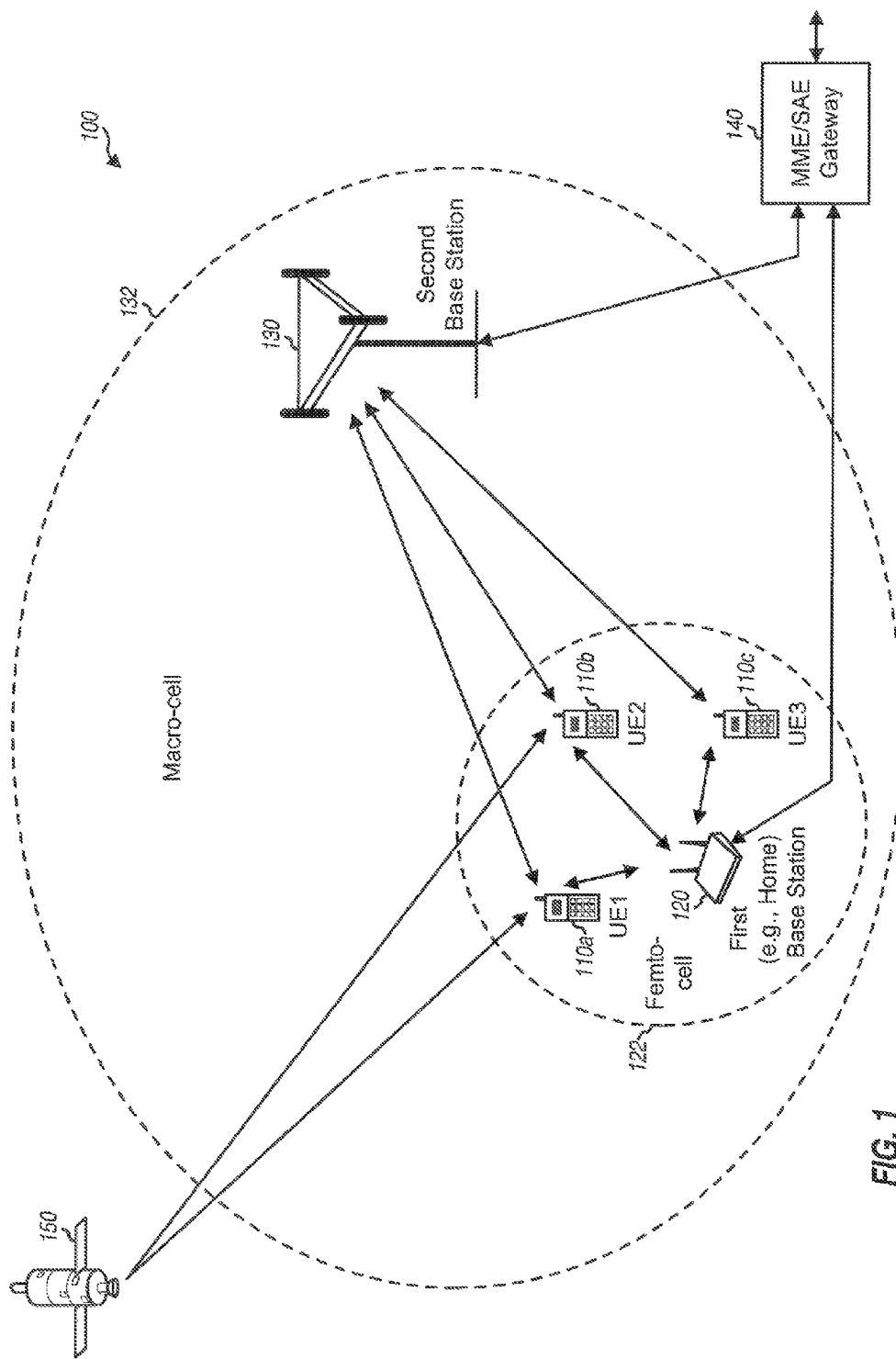
FIG. 1 shows a cellular communication network.

FIG. 1 shows a cellular communication network 100, which may be an LTE network. Cellular network 100 may include base stations and other network entities described by 3GPP. For simplicity, only two base stations 120 and 130 and one Mobility Management Entity/System Architecture Evolution (MME/SAE) gateway 140 are shown in FIG. 1. A base station is a station that communicates with the UEs and may also be referred to as a Node B, an evolved Node B (eNB), an access point, etc. Base station 130 may provide radio coverage for a relatively large geographic area, e.g., up to 10 kilometer (Km) in radius. The coverage area of base station 130 may be partitioned into multiple (e.g., three) smaller areas. In 3GPP, the term "macro-cell" can refer to the smallest coverage area of base station 130 and/or a base station subsystem serving this coverage area, depending on the context in which the term is used. In 3GPP2, the term "sector" can refer to the smallest coverage area of a base station and/or a base station subsystem serving this coverage area. For clarity, 3GPP concept of cell is used in the description below. For simplicity, FIG. 1 shows one macro-cell for base station 130.

Home base station 120 may provide radio coverage for a relatively small geographic area, e.g., a home, a shop, a store, etc. Home base station 120 may also be referred to as a home access point (HAP), a home Node B, a home eNB, etc. The term "femto-cell" can refer to the coverage area of a home base station and/or a home base station subsystem serving this coverage area. Home base station 120 may be configured to provide restricted access to a specific group of UEs, which may belong in a closed subscriber group (CSG). Home base station 120 may allow a network operator to extend the coverage of the cellular network, to increase capacity, and/or to obtain other advantages. Home base station 120 may be considered as part of the cellular network and may communicate with other network entities in the cellular network. The functions of home base station 120 are described in 3GPP TR 25.820, entitled "3G Home NodeB Study Item Technical Report," which is publicly available.

Base stations 120 and 130 are two types of base stations that may have different coverage areas and capabilities. A cellular network may also include other types of base stations. For example, a base station may provide radio coverage for a medium geographic area. Such a base station may be deployed without advanced network planning, e.g., in a disaster area or a military zone. The term "pico-cell" can refer to the coverage area of such a base station and/or a base station subsystem serving this coverage area.

Base stations 120 and 130 may communicate with each other directly via an X2 interface (not shown in FIG. 1), which may be a logical or physical interface. Base stations 120 and 130 may also communicate with MME/SAE gateway 140 via an S1 interface. Base stations 120 and 130 may also communicate with each other indirectly via MME/SAE gateway 140, which may act as an intermediary. MME/SAE gateway 140 may support data services such as packet data, Voice-over-IP (VoIP), video, messaging, etc. MME/SAE gateway 140 may couple to a core network and/or other data network (e.g., the Internet) and may communicate with other entities (e.g., remote servers and terminals) that couple to these networks. The functions of base station 130 and MME/SAE gateway 140 are described in 3GPP TS 36.300, entitled "Evolved Universal Terrestrial Radio Access (E-UTRA) and Evolved Universal Terrestrial Radio Access Network (E-UTRAN); Overall description; Stage 2," which is publicly available.

UEs 110 may communicate with base station 120 and/or 130 via the downlink and uplink. The downlink (or forward link) refers to the communication link from a base station to a UE, and the uplink (or reverse link) refers to the communication link from the UE to the base station. A UE may be stationary or mobile and may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc.

A UE may communicate with base station 120 or 130 to obtain communication services such as voice, video, packet data, broadcast, messaging, etc. A UE may also be within radio coverage of home base station 120 but may not be able to access the home base station for communication services, e.g., because the home base station covers a home and the UE is not authorized to access the home base station in this home. A UE may have capability to exchange lower-layer signaling with home base station 120 (which may be useful for positioning) even though the UE may not be authorized to access the home base station.

A UE may also receive signals from one or more satellites 150, which may be part of the United States Global Positioning System (GPS), the European Galileo system, the Russian GLONASS system, or some other Global Navigation Satellite System (GNSS). The UE may measure signals from satellites 150 and obtain pseudo-range measurements. The UE may also measure signals from base station 120 and/or 130 and obtain timing measurements. The pseudo-range measurements and/or timing measurements as well as the known positions of satellites 150, home base station 120, and/or base station 130 may be used to derive a position estimate for the UE. A position estimate may also be referred to as a location estimate, a position fix, etc. A position estimate may be derived using one or a combination of positioning methods such as assisted GPS (A-GPS), standalone GPS, Advanced Forward Link Trilateration (A-FLT), Enhanced Observed Time Difference (E-OTD), Observed Time Difference Of Arrival (OTDOA), Enhanced Cell ID, Cell ID, etc.

Base station 130 is typically a fixed station deployed at a specific location determined by the network operator. In contrast, home base station 120 may be physically moved without the network operator's direct knowledge. As a result, it may be difficult or impossible to obtain position information directly from services routed through home base station 120, which may be problematic in certain situations such as emergency calls. Home base station 120 may be equipped with a GPS receiver (or other GNSS receiver(s)) and may be able to autonomously determine its position. However, this GPS capability may increase the cost of home base station 120, which may be undesirable. Furthermore, home base station 120 is typically deployed indoors where GPS coverage may be unavailable or unreliable.

In many cases, a UE that is within radio coverage of home base station 120 may have position information available, e.g., through location services (LCS) obtained via nearby base stations. The position of home base station 120 may then be determined based on the position information for UEs visible to the home base station.

Figure 2A:
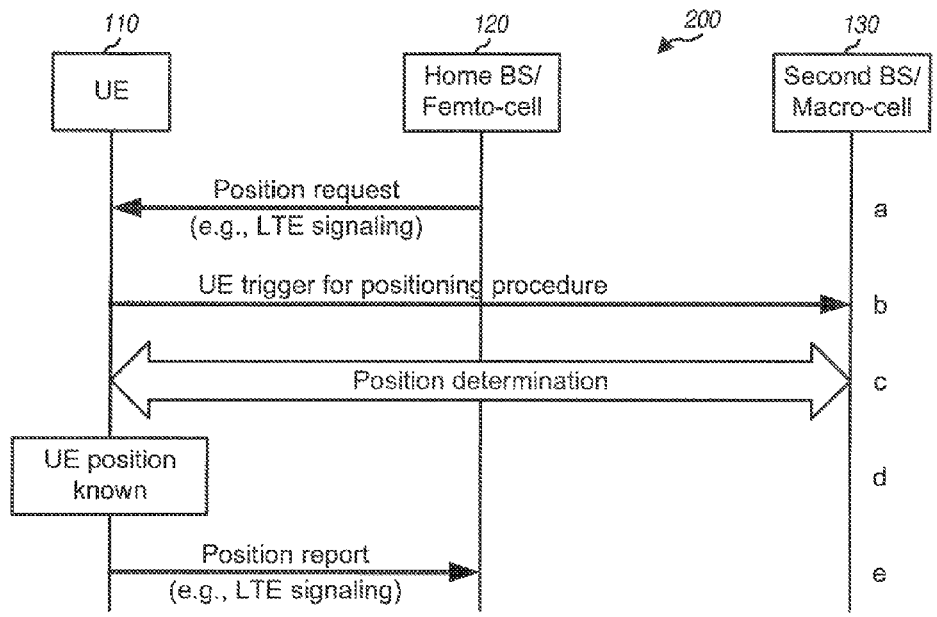
FIGS. 2A and 2B show two message flows for providing a UE position to a home base station.

FIG. 2A shows a design of a message flow 200 for providing the position of a UE 110 to home base station 120. UE 110 may be any one of the UEs shown in FIG. 1 and may be within radio coverage of both base stations 120 and 130 in FIG. 1. Home base station 120 may send a position request to UE 110 to request the position of the UE (step a). UE 110 may then send a message to base station 130 to trigger a positioning procedure, which may be any positioning procedure supported by the UE and the cellular network (step b). UE 110 and base station 130 (and possibly other network entities) may thereafter exchange messages for the positioning procedure (step c). For example, UE 110 may have A-GPS positioning capability and may obtain assistance data from the positioning procedure. UE 110 may then obtain pseudo-range measurements for satellites 150 using the assistance data and may determine its position based on the pseudo-range measurements and the known positions of the satellites. As another example, UE 110 may obtain timing measurements for base station 130 and possibly other base stations. The position of UE 110 may then be determined based on the timing measurements and the known positions of base station 130 and possibly other base stations. The position of UE 110 may also be determined in other manners. In any case, a position estimate for UE 110 may be available to the UE, e.g., computed by the UE or provided by base station 130 (step d). UE 110 may then send a position report containing the position estimate for the UE to home base station 120 (step e).

Figure 2B:
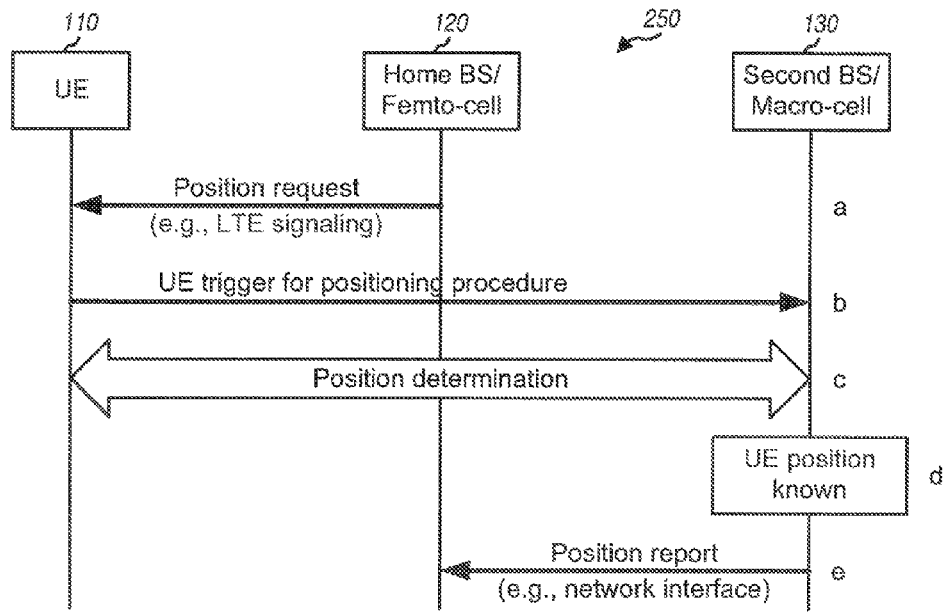

FIG. 2B shows a design of a message flow 250 for providing the position of UE 110 to home base station 120 by base station 130. UE 110 may be within radio coverage of both base stations 120 and 130. Home base station 120 may send a position request to UE 110 to request the position of the UE (step a). UE 110 may then send a message to base station 130 to trigger a positioning procedure (step b) and may exchange messages with base station 130 for the positioning procedure (step c). A position estimate for UE 110 may be available to base station 130, e.g., computed by the base station or provided by the UE (step d). Base station 130 may then send a position report containing the position estimate for the UE to home base station 120 (step e).

As shown in FIGS. 2A and 2B, UE 110 may be able to determine its position or may have its position determined by the cellular network. In the first case, UE 110 may send its position estimate directly to home base station 120 (e.g., as shown in FIG. 2A). In the second case, the position estimate for the UE may be passed via the network interface between base stations 120 and 130 (e.g., as shown in FIG. 2B) or from base station 130 to the UE and then from the UE to home base station 120.

FIGS. 2A and 2B show a position request being sent from home base station 120 to UE 110. The position request may also be sent from home base station 120 to base station 130, which may then forward the position request to UE 110 or trigger a positioning procedure with the UE. The messages in FIGS. 2A and 2B may be messages defined by LTE or messages for other technologies or standards. Home base station 120 may communicate directly with base station 130 (e.g., via the X2 interface in LTE) or indirectly with base station 130 (e.g., via MME/SAE gateway 140).

The position of home base station 120 may be determined based on the position of UE 110. In one design, home base station 120 may be assumed to be co-located with UE 110, and the position estimate for the UE may be used as a position estimate for the home base station. The accuracy of this position estimate for home base station 120 may be dependent on the coverage area of the home base station. The suitability of this home base station position estimate may be dependent on the requirements of a particular location-based application. For example, the coverage area of home base station 120 may have a diameter on the order of tens of meters. The home base station position estimate may then have an uncertainty on the order of tens of meters. This position accuracy may be adequate for some services requiring position information (e.g., location-targeted advertisements or local mapping services) but may be inadequate for other services (e.g., locating the source of an emergency call in an environment where houses are closely packed). The position of home base station 120 may be more accurately estimated based on more UE position estimates.

Figure 3A:
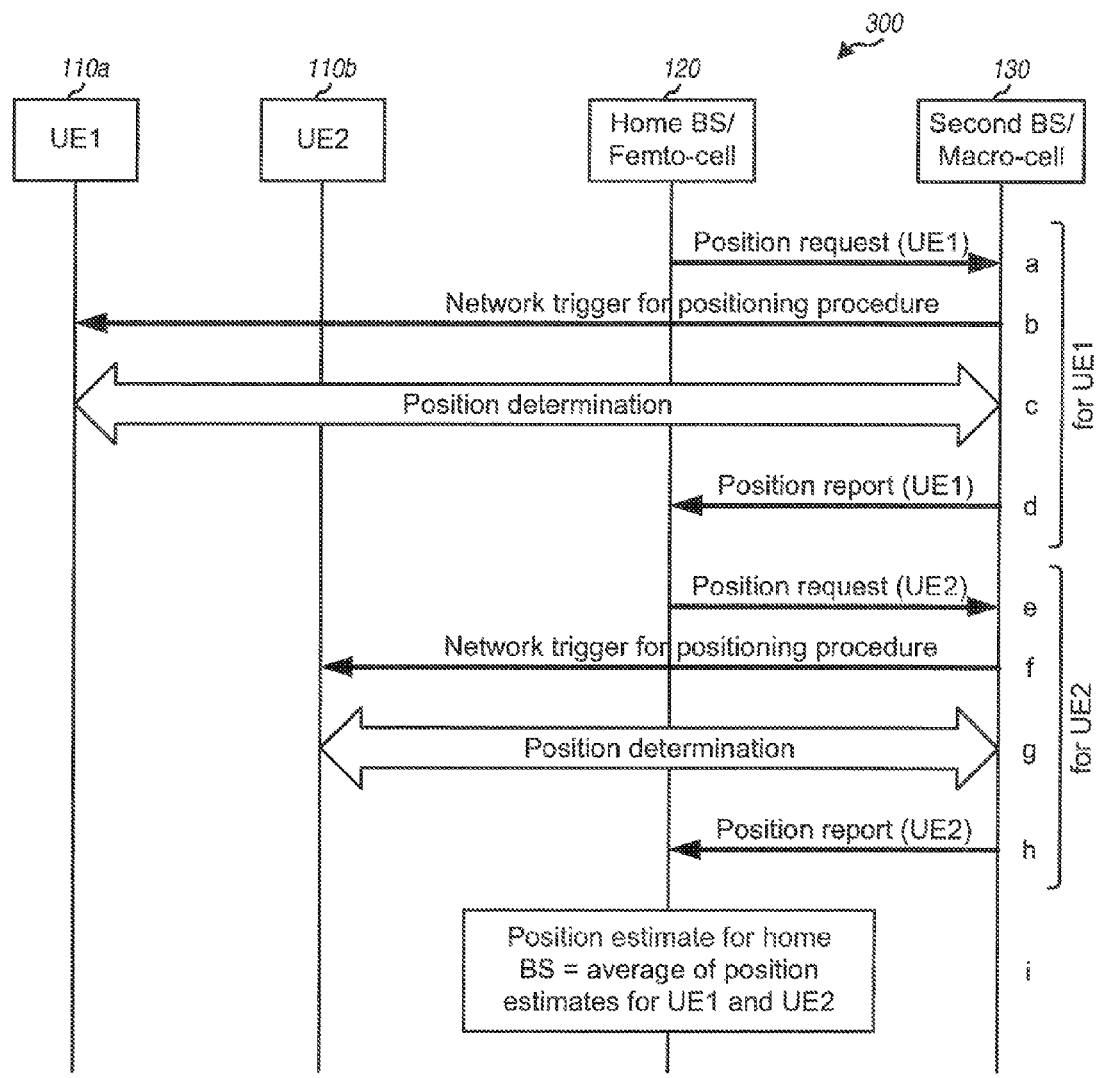
FIGS. 3A and 3B show two message flows for determining the position of the home base station based on population and/or time averaging.

FIG. 3A shows a design of a message flow 300 for more accurately determining the position of home base station 120 based on population averaging. UEs 110a and 110b, which are also referred to as UE1 and UE2, respectively, may be within radio coverage of both base stations 120 and 130. UEs 110a and 110b may be able to communicate with base station 130 and may or may not be able to access home base station 120.

Home base station 120 may send a position request to base station 130 to request the position of UE 110a (step a). Base station 130 may then send a message to UE 110a to trigger a positioning procedure (step b) and may exchange messages with UE 110a for the positioning procedure (step c). Base station 130 may obtain a position estimate for UE 110a from the positioning procedure and may send a position report containing this position estimate to home base station 120 (step d). Similarly, home base station 120 may send a position request to base station 130 to request the position of UE 110b (step e). Base station 130 may then send a message to UE 110b to trigger a positioning procedure (step f) and may exchange messages with UE 110b for the positioning procedure (step g). Base station 130 may obtain a position estimate for UE 110b from the positioning procedure and may send a position report containing this position estimate to home base station 120 (step h).

In general, home base station 120 may send any number of position requests for any number of UEs and may obtain position estimates for these UEs from base station 130. Home base station 120 may then estimate its position based on the position estimates for all UEs, e.g., by averaging the UE position estimates (step i).

Figure 3B:
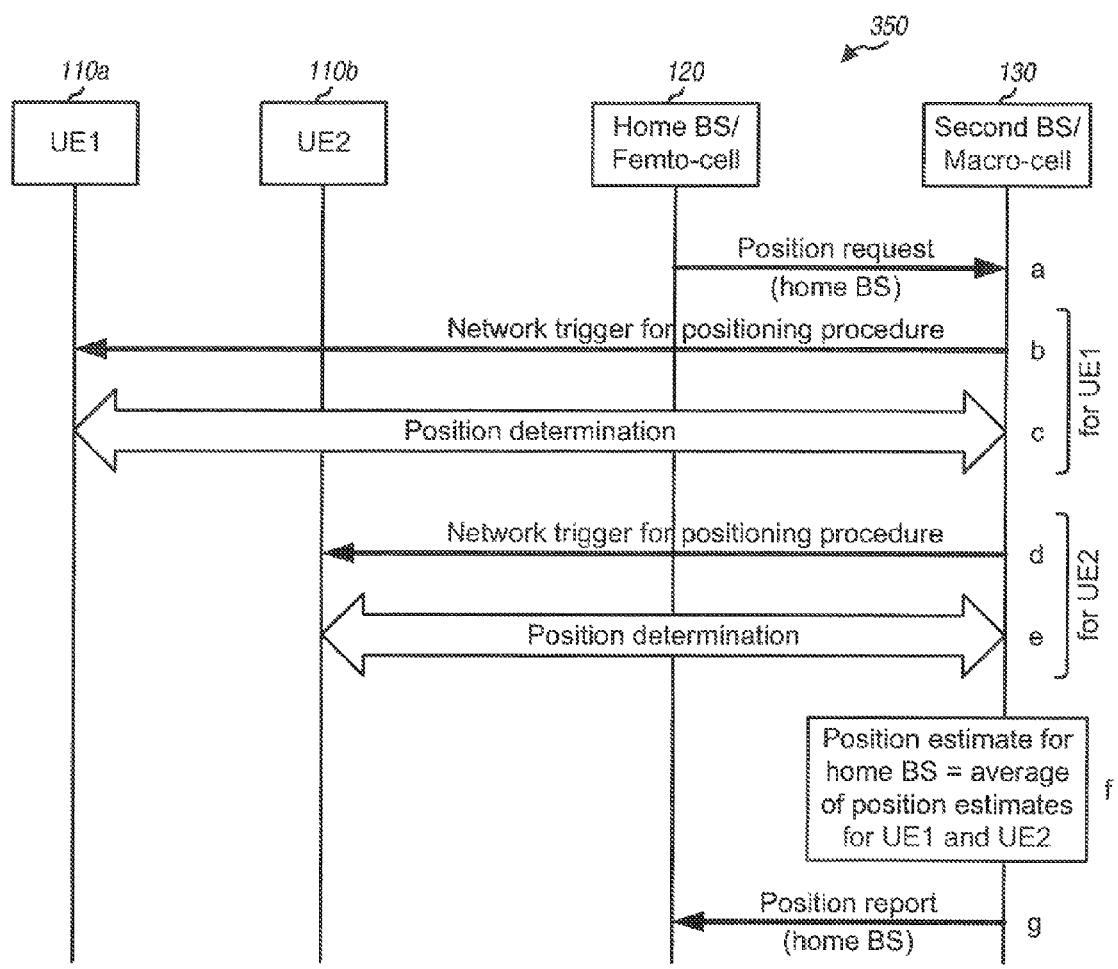

FIG. 3B shows a design of a message flow 350 for determining the position of home base station 120 with population averaging by base station 130. Home base station 120 may send a position request to base station 130 to request the position of the home base station (step a). Base station 130 may send a message to UE 110a to trigger a positioning procedure (step b), exchange messages with UE 110a for the positioning procedure (step c), and obtain a position estimate for UE 110a from the positioning procedure. Base station 130 may also send a message to UE 110b to trigger a positioning procedure (step d), exchange messages with UE 110b for the positioning procedure (step e), and obtain a position estimate for UE 110b from the positioning procedure.

In general, base station 130 may obtain position estimates for any number of UEs within radio coverage of home base station 120. Base station 130 may then estimate the position of home base station 120 based on the position estimates for all UEs, e.g., by averaging the UE position estimates to obtain a position estimate for the home base station (step f). Base station 130 may then send a position report containing this home base station position estimate to the home base station (step g).

The design in FIG. 3A may be considered as a home base station-hosted scheme. In this design, home base station 120 may be responsible for determining its position based on the available UE position estimates. Home base station 120 may also be responsible for collecting the UE position estimates. Home base station 120 may send a separate position request for each UE (as shown in FIG. 3A), a single position request for a specific set of UEs, or a single position request for all UEs within radio coverage of the home base station.

The design in FIG. 3B may be considered as a network-hosted scheme. In this design, base station 130 (and/or some other network entity) may be responsible for collecting position estimates for UEs within radio coverage of home base station 120 and for determining the position of the home base station based on the UE position estimates. Base station 130 may identify the UEs within radio coverage of home base station 120 based on information received from the home base station and/or information received from the UEs. In one design, the position request sent by home base station 120 in step a in FIG. 3B may include a list of UEs that are detectable by the home base station. In another design, base station 130 may identify the UEs within radio coverage of home base station 120 based on measurement reports and/or other signaling received from these UEs. The design in FIG. 3B may simplify the implementation and operation of home base station 120. In particular, home base station 120 may send a single position request for its position to base station 130 and may receive a single position report with a position estimate for home base station 120 from base station 130, as shown in FIG. 3B.

FIGS. 3A and 3B show determination of the position of home base station 120 using population averaging. The position of home base station 120 may also be determined using time averaging. In this case, the position of a single mobile UE may be determined at different times and provided to home base station 120 (for the home base station-hosted scheme) or to base station 130 (for the network-hosted scheme). The position of home base station 120 may then be determined based on all position estimates for this single UE, e.g., by averaging the UE position estimates. Message flow 300 in FIG. 3A and message flow 350 in FIG. 3B may be used for time averaging. In this case, UE1 and UE2 may correspond to the same UE, and the position requests may be sent at different times sufficiently far apart. The position of home base station 120 may also be determined using a combination of population and time averaging. The position of home base station 120 may also be determined with a single UE position estimate, which may be obtained by base station 130 and provided to the home base station, as shown in FIG. 2B. In general, any number of position estimates for any number of UEs may be averaged to obtain a position estimate for home base station 120.

For population and/or time averaging, the accuracy of the home base station position estimate may be dependent on the distribution of the UE position estimates used to derive the home base station position estimate. Accuracy may be improved for more even distribution of the UE position estimates (e.g., due to more even distribution of UEs and/or their movements) and for a larger number of UE position estimates used for averaging. The UE position estimates may be obtained over a period of time, and the home base station position estimate may be updated when new UE position estimates become available. Significant movement of home base station 120 may be a fairly uncommon event and may be detected quickly if a UE position estimate is outside an expected coverage area of the home base station.

In general, any UE that is within radio coverage of home base station 120 may be used to determine the position of home base station 120. The UEs used to determine the position of home base station 120 do not need to actually access the home base station. These UEs may be identified by home base station 120 (e.g., based on signals received from the UEs) or identified by the UEs (e.g., based on signal received from the home base station). The number of UEs that can be used to determine the position of home base station 120 may be greater than the number of UEs that can access the home base station.

FIG. 3A shows a design in which home base station 120 sends position requests for different UEs to base station 130 and obtain position estimates for these UEs from base station 130. FIG. 3B shows a design in which home base station 120 sends a position request for its position to base station 130, which obtains position estimates for UEs and determines the position of the home base station. In another design, home base station 120 may send position requests directly to the UEs. The positions of these UEs may then be determined and sent to base station 120 or 130. In yet another design, base station 130 may send messages to the UEs to trigger the positioning procedure (e.g., as shown in FIG. 3B), and the UEs may send their position estimates directly to home base station 120. The messages and UE position estimates may also be sent between the various entities in other manners.

The position of home base station 120 may also be determined based on RTT measurements for one or more UEs and known positions of the UEs using trilateration. The round trip time between home base station 120 and a UE may be measured, and the RTT measurement may be converted to a distance between the home base station and the UE. The position of home base station 120 may be determined based on (i) RTT measurements for multiple UEs and the known positions of these UEs or (ii) RTT measurements for a single mobile UE at different known positions.

Figure 4A:
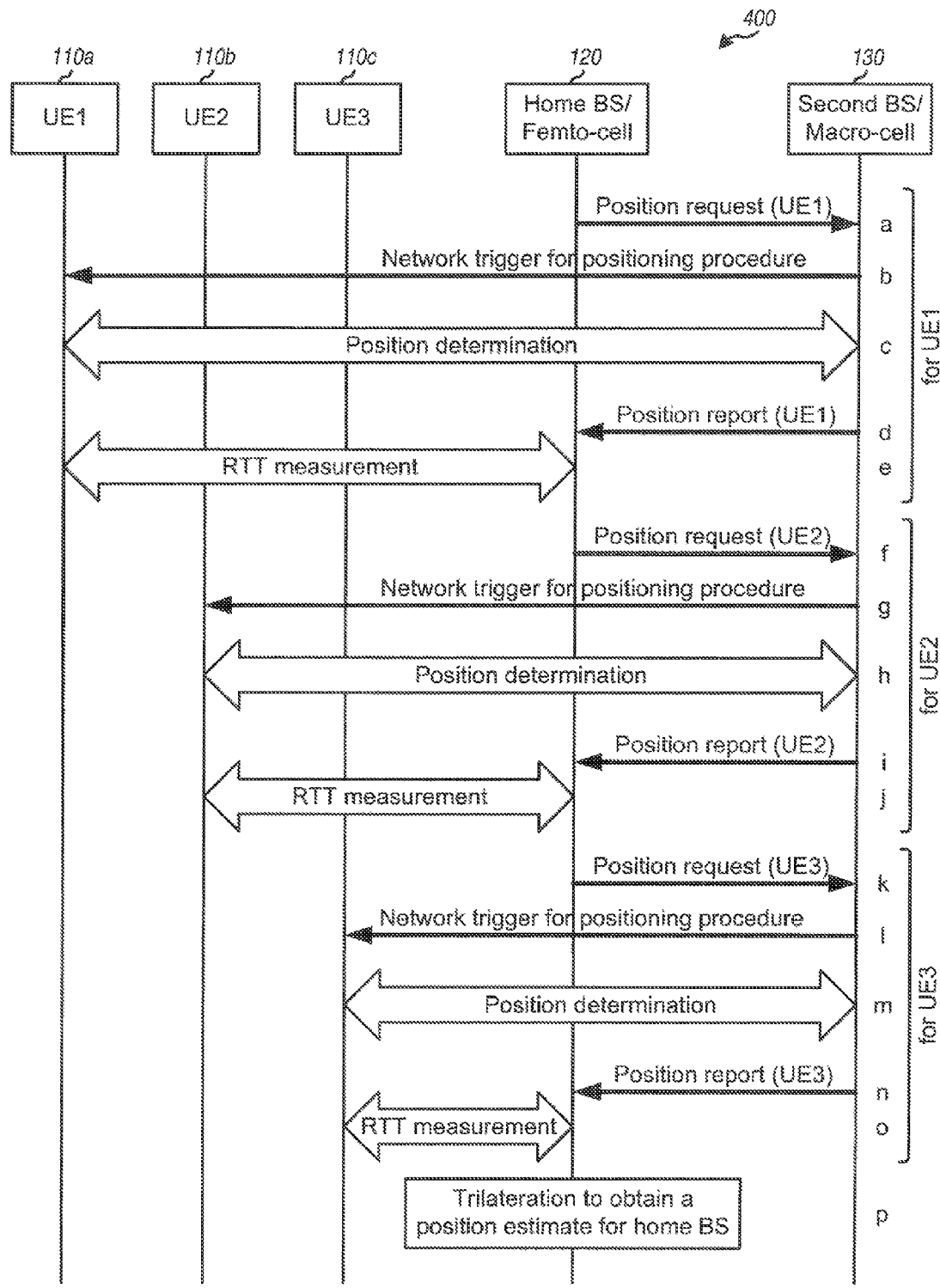
FIGS. 4A and 4B show two message flows for determining the position of the home base station based on trilateration with RTT measurements.

FIG. 4A shows a design of a message flow 400 for determining the position of home base station 120 based on trilateration with RTT measurements. Home base station 120 may send a position request to base station 130 to request the position of UE 110a (step a). Base station 130 may then send a message to UE 110a to trigger a positioning procedure (step b), exchange messages with UE 110a for the positioning procedure (step c), obtain a position estimate for UE 110a from the positioning procedure, and send a position report containing this position estimate to home base station 120 (step d). Home base station 120 may also exchange signaling with UE 110a to obtain an RTT measurement for UE 110a (step e). Home base station 120 may similarly exchange messages with base station 130 to obtain a position estimate for UE 110b (steps f and i) and may exchange signaling with UE 110b to obtain an RTT measurement for UE 110b (step j). Home base station 120 may also exchange messages with base station 130 to obtain a position estimate for UE 110c (steps k and n) and may exchange signaling with UE 110c to obtain an RTT measurement for UE 110c (step o).

Home base station 120 may obtain three RTT measurements for three UEs 110a, 110b and 110c and may also obtain position estimates for these UEs. Home base station 120 may then determine its position based on the RTT measurements and the UE position estimates using trilateration (step p).

Figure 4B:
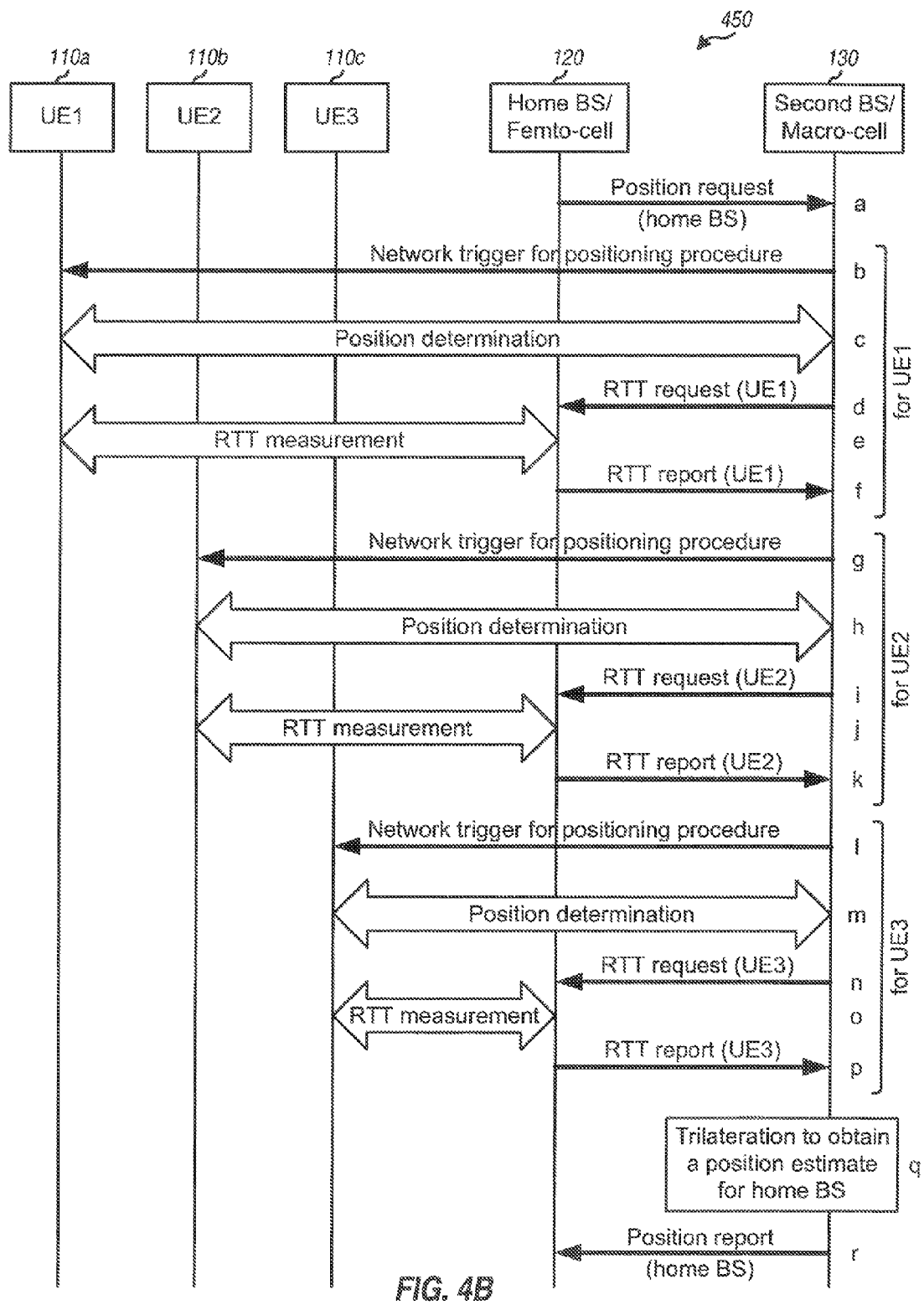

FIG. 4B shows a design of a message flow 450 for determining the position of home base station 120 by base station 130 based on trilateration with RTT measurements. Home base station 120 may send a position request for its position to base station 130 (step a). Base station 130 may then send a message to UE 110a to trigger a positioning procedure (step b), exchange messages with UE 110a for the positioning procedure (step c), and obtain a position estimate for UE 110a from the positioning procedure. Base station 130 may send an RTT request to home base station 120 to request an RTT measurement for UE 110a (step d). Home base station 120 may exchange signaling with UE 110a to obtain an RTT measurement for UE 110a (step e) and may send an RTT report containing the RTT measurement to base station 130 (step f). Base station 130 may similarly exchange messages with UE 110b to obtain a position estimate for UE 110b (steps g and h) and may exchange messages with home base station 120 to obtain an RTT measurement for UE 110b (steps i and k). Base station 130 may also exchange messages with UE 110c to obtain a position estimate for UE 110c (steps l and m) and may exchange messages with home base station 120 to obtain an RTT measurement for UE 110c (steps n and p).

Base station 130 may obtain three RTT measurements for three UEs 110a, 110b and 110c and may also obtain position estimates for these UEs. Base station 130 may then determine the position of home base station 120 based on the RTT measurements and the UE position estimates using trilateration (step q). Base station 130 may then send a position report containing a position estimate for the home base station to the home base station (step r).

FIGS. 4A and 4B show trilateration using three RTT measurements for three UEs 110a, 110b and 110c. Trilateration may also be performed based on RTT measurements for a single mobile UE at different positions. In general, trilateration may be performed based on three or more RTT measurements for one or more UEs. Each RTT measurement may be associated with a UE position. The UE position may be determined prior to the RTT measurement (as shown in FIGS. 4A and 4B), or after the RTT measurement, or concurrent with the RTT measurement. The RTT measurement and the associated UE position should be obtained as close in time as possible.

Trilateration may be performed based on three or more RTT measurements and the associated UE position estimates. More RTT measurements obtained over time and/or for more UEs may be averaged to obtain a more accurate position estimate for home base station 120. Averaging over time may result in the position estimate for home base station 120 being susceptible to undetectable error if the home base station moves between RTT measurements. To reduce the likelihood of undetectable error, the RTT measurements used to determine the position of home base station 120 should be obtained reasonably close together in time.

FIG. 4A shows a design in which home base station 120 sends position requests for different UEs to base station 130 and obtain position estimates for these UEs from base station 130. FIG. 4B shows a design in which home base station 120 sends a position request for its position to base station 130 and receive RTT requests for different UEs from base station 130.

In another design, base station 130 may send RTT requests directly to the UEs (instead of to home base station 120 as shown in FIG. 4B) and may receive RTT measurements directly from the UEs. This design may allow UEs not permitted to access home base station 120 to nevertheless contribute to the position estimate for the home base station. These UEs may measure round trip time to home base station 120 without actually obtaining service from the home base station. For example, a UE may send lower-layer (e.g., physical layer) signaling to home base station 120, which may return a lower-layer response. The UE may then obtain an RTT measurement based on the lower-layer signaling and the lower-layer response, without invoking service or a higher layer response from home base station 120. This design may reduce complexity of home base station 120, since RTT requests may be sent directly from base station 130 to the UEs, and RTT measurements may be sent directly from the UEs to base station 130.

In another design, home base station 120 may provide a list of RTT measurements for specific UEs in the position request sent to base station 130 in step a in FIG. 4B. Base station 130 may then determine the positions of the UEs identified in the list. This list may avoid the need for base station 130 to send RTT requests to home base station 120 or the UEs and to receive RTT reports from home base station 120 or the UEs. The messages and RTT measurements may also be sent between the various entities in other manners.

For all designs, the accuracy of the home base station position estimate computed by trilateration may be dependent on how closely the UE positions "match" the RTT measurements. Improved accuracy for the home base station position estimate may be obtained by (i) determining the UE positions as close in time with the RTT measurements as possible, (ii) using RTT measurements for UEs that are stationary or have low mobility, and/or (iii) compensating the RTT measurements for mobile UEs by back-propagating the UE velocities to estimate the UE positions at the time of the RTT measurements.

In the designs described above, the position of home base station 120 may be determined when requested by the home base station or some other entity. The cellular network may assist in determining the UE positions, which may be used to determine the position of home base station 120.

In another design, the cellular network may autonomously maintain a database of home base station positions based on measurement reports from UEs. A UE within the coverage area of the cellular network may report that the UE is within radio coverage of home base station 120. The cellular network may determine the UE position at this time using any positioning method supported by the cellular network and the UE. The cellular network may use a position estimate for the UE to determine the position of home base station 120, e.g., using any of the positioning methods described above. The cellular network may store position estimates for UEs for averaging over time and/or population. If home base station 120 later requests its position, then the cellular network may already have a position estimate for home base station 120 and may simply deliver this position estimate to the home base station.

Figure 5:
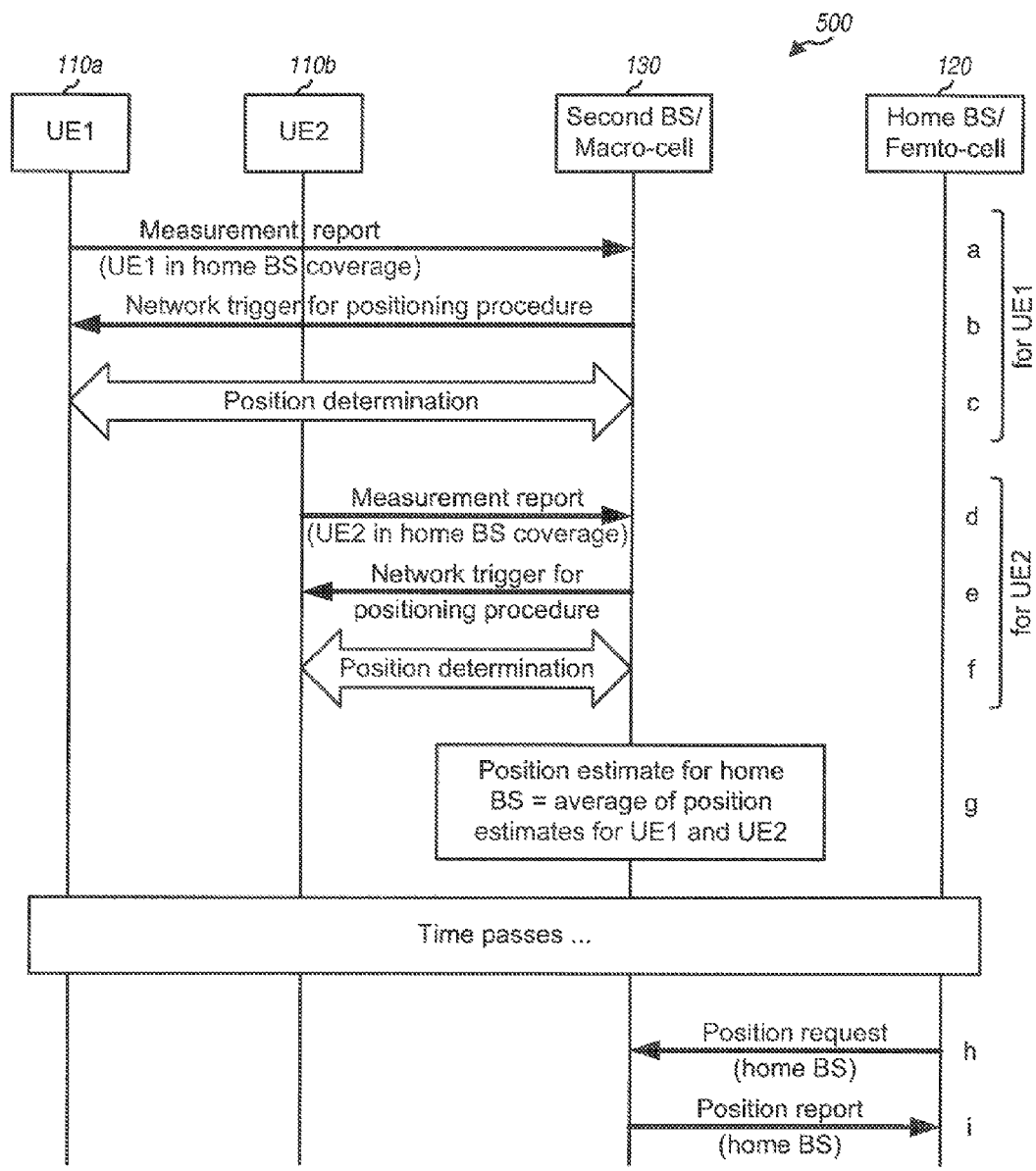
FIG. 5 shows a message flow for pre-computation of the position of the home base station by the cellular network.

FIG. 5 shows a design of a message flow 500 for autonomous pre-computation of the position of home base station 120 by the cellular network. Base station 130 may receive a measurement report from UE 110a, e.g., as part of normal operation in the cellular network (step a). Base station 130 may then send a message to UE 110a to trigger a positioning procedure (step b), exchange messages with UE 110a for the positioning procedure (step c), and obtain a position estimate for UE 110a. Similarly, base station 130 may receive a measurement report from UE 110b (step d). Base station 130 may then send a message to UE 110b to trigger a positioning procedure (step e), exchange messages with UE 110b for the positioning procedure (step f), and obtain a position estimate for UE 110b. Base station 130 may derive a position estimate for home base station 120 based on the position estimates for UEs 110a and 110b (step g). Base station 130 may update the position estimate for home base station 120 as more UE position estimates become available.

At a later time, home base station 120 may send a position request to base station 130 to request the position of the home base station (step h). Base station 130 may send a position report containing the position estimate for the home base station to the home base station (step i).

In the design shown in FIG. 5, the position of home base station 120 may be estimated by averaging the available UE position estimates. In another design, the cellular network may request RTT measurements either from home base station 120 or from UEs within radio coverage of the home base station. The position of home base station 120 may then be determined based on the RTT measurements using trilateration. The RTT measurements may be obtained from the UEs without involvement by home base station 120. Alternatively, home base station 120 may assist in procuring the RTT measurements and may act as an RTT server.

The cellular network may maintain the database of home base station positions, which may be identified or keyed by unique identifiers. An identifier may be defined by a combination of PLMN and cell identities (IDs) signaled by a home base station or by some other ID or combination of IDs. The home base station positions in the database may be refined over time as more UE positions become available. Movement of home base station 120 may be detected almost immediately, since all UEs associated with home base station 120 may suddenly report very different positions than expected. The cellular network may respond in various manners when substantial movement of home base station 120 is detected. The cellular network may flag the database entry for home base station 120 as "probably moved" and may start determining the position of home base station 120 anew (e.g., restart the averaging process). The cellular network may also initiate a position update for home base station 120 using one of the message flows described above. The cellular network may maintain volatility information, which may indicate which home base stations are more prone to move. In practice, many home base stations should be mostly stationary, and the home base station positions in the database should be valid most of the time. When the position of a home base station is requested by an entity (e.g., home base station 120 or by an external client), the cellular network can generally have a position estimate available for immediate delivery to the requesting entity.

In the designs described above, the position of home base station 120 may be determined based on the positions of one or more UEs. The UE positions may in turn be determined based on UE interactions with base stations/macro-cells in the cellular network, which may support UE positioning. A UE may have stand-alone positioning capability (e.g., a GPS receiver) and may be able to autonomously determine its position without interactions with the cellular network. The UE may report its position to base station 120 and/or 130 when requested.

In general, the position of home base station 120 may be determined based on UE positions that may be estimated using any positioning methods. When performing averaging, more weight may be given to UE positions obtained with more accurate positioning methods (e.g., GPS or A-GPS) and/or UE positions obtained more recently.

Figures 6, 7:
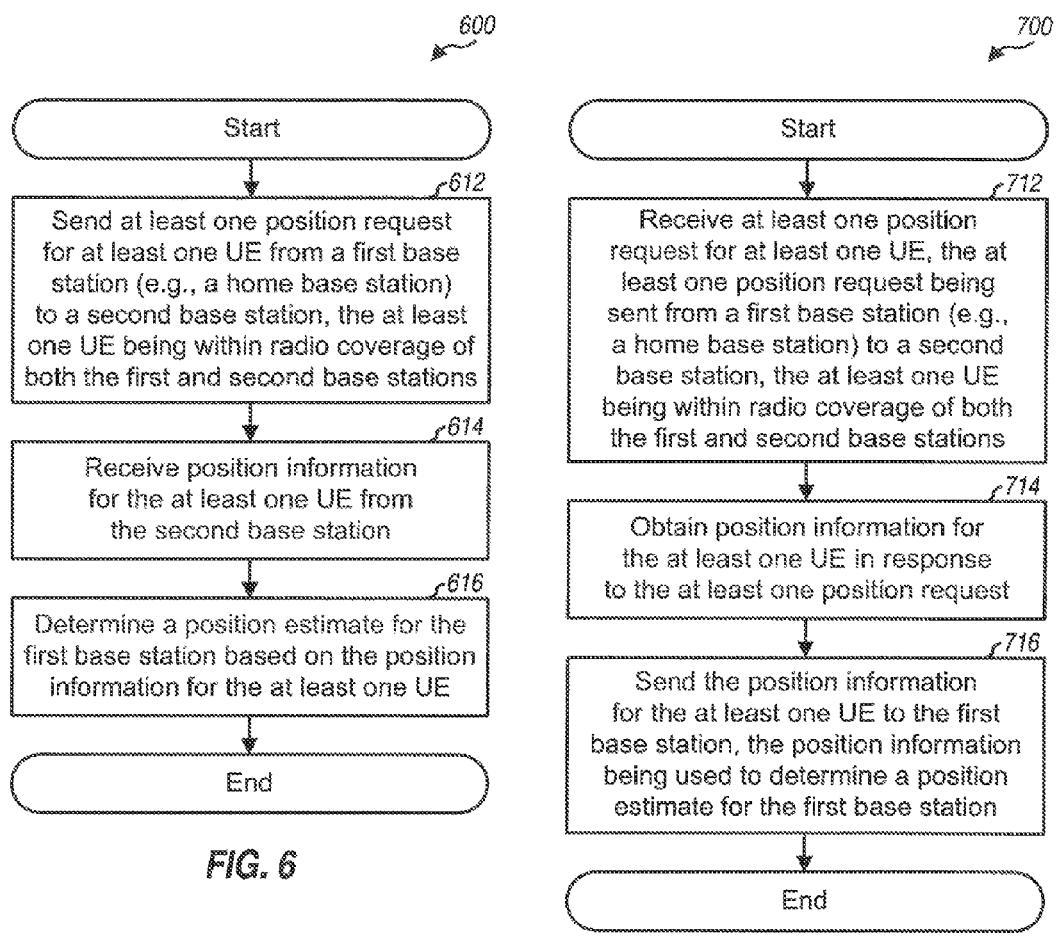
FIGS. 6 and 7 show processes performed by the home base station and a second base station, respectively, to determine the position of the home base station by the home base station.

FIG. 6 shows a design of a process 600 performed by a network entity to determine its position. Process 600 may be performed by home base station 120 for message flows such as those shown in FIGS. 3A and 4A. A first base station (e.g., home base station 120) may send at least one position request for at least one UE to a second base station (e.g., base station 130) (block 612). The first and second base stations may communicate over a direct network interface (e.g., an X2 interface) or indirectly via an intermediate node (e.g., using an S1 interface with an MME/SAE gateway as an intermediary). The at least one UE may be within radio coverage of both the first and second base stations. The first base station may identify one or more UEs in each position request (e.g., as shown in FIGS. 3A and 4A) or may send a list of the at least one UE to the second base station. The first base station may receive position information for the at least one UE from the second base station (block 614). The first base station may then determine a position estimate for itself based on the position information for the at least one UE (block 616).

In one design of block 616, the first base station may obtain multiple position estimates for the at least one UE from the position information. The first base station may then average the multiple position estimates for the at least one UE to obtain the position estimate for itself, e.g., as shown in FIG. 3A. In another design of block 616, the first base station may obtain multiple RTT measurements for the at least one UE and may also obtain multiple position estimates for the at least one UE from the position information. The first base station may then determine the position estimate for itself based on the multiple RTT measurements and the multiple position estimates for the at least one UE, e.g., as shown in FIG. 4A. Other types of timing measurements (instead of RTT measurements) may also be used for trilateration.

In one design, the first base station may obtain multiple position estimates for multiple UEs from the position information. In another design, the first base station may obtain multiple position estimates obtained at different times for a single UE from the position information. For both designs, the first base station may determine the position estimate for itself based on the multiple position estimates for the single or multiple UEs.

The first base station may be a home base station providing radio coverage for a femto-cell. The second base station may provide radio coverage for a macro-cell that encompasses the femto-cell. The second base station may also be another home base station or a base station providing radio coverage for a cell that overlaps the femto-cell. Each of the at least one UE may or may not have access to the first base station but may nevertheless be used to determine the position estimate for the first base station.

FIG. 7 shows a design of a process 700 performed by a network entity to support positioning by another network entity. Process 700 may be performed by base station 130 for message flows such as those shown in FIGS. 3A and 4A. A second base station (e.g., base station 130) may receive at least one position request for at least one UE from a first base station (e.g., home base station 120) (block 712). The at least one UE may be within radio coverage of both the first and second base stations. The second base station may obtain position information for the at least one UE in response to the at least one position request (block 714). The second base station may send the position information for the at least one UE to the first base station (block 716). The position information may be used to determine a position estimate for the first base station.

Figure 8:
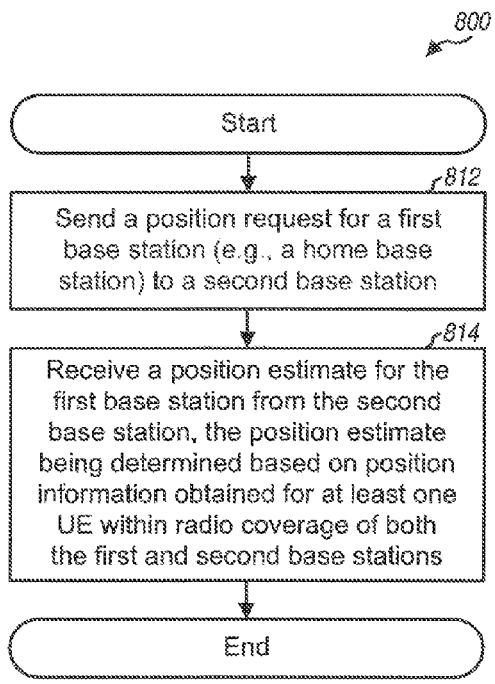
FIGS. 8 and 9 show processes performed by the home base station and the second base station, respectively, to determine the position of the home base station by the second base station.

FIG. 8 shows a design of a process 800 performed by a network entity to obtain its position estimate from another network entity. Process 800 may be performed by home base station 120 for message flows such as those shown in FIGS. 3B and 4B. A first base station (e.g., home base station 120) may send a request for its position to a second base station (e.g., base station 130) (block 812). The first base station may receive a position estimate for itself from the second base station (block 814). The position estimate may be determined based on position information obtained for at least one UE within radio coverage of both the first and second base stations.

Figure 9:
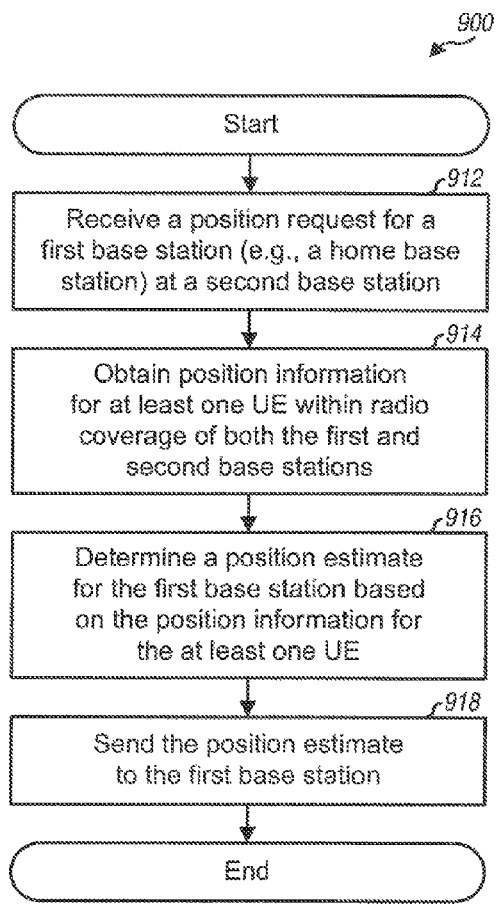

FIG. 9 shows a design of a process 900 performed by a network entity to determine the position of another network entity. Process 900 may be performed by base station 130 for message flows such as those shown in FIGS. 3B and 4B. A second base station (e.g., base station 130) may receive a position request for a first base station (block 912). The second base station may obtain position information for at least one UE within radio coverage of both the first and second base stations (block 914). The second base station may receive a list of the at least one UE from the first base station or may identify the at least one UE based on measurement reports received from the at least one UE. The second base station may determine a position estimate for the first base station based on the position information for the at least one UE (block 916). The second base station may then send the position estimate to the first base station (block 918).

In one design, the second base station may obtain multiple position estimates for the at least one UE from the position information. The second base station may then average the multiple position estimates for the at least one UE to obtain the position estimate for the first base station, e.g., as shown in FIG. 3B. In another design, the second base station may obtaining multiple RTT measurements for the at least one UE. The second base station may send at least one RTT request to the first base station and may receive the multiple RTT measurements for the at least one UE from the first base station, e.g., as shown in FIG. 4B. Alternatively, the second base station may receive the multiple RTT measurements directly from the at least one UE. The second base station may also obtain multiple position estimates for the at least one UE from the position information. The second base station may then determine the position estimate for the first base station based on the multiple RTT measurements and the multiple position estimates for the at least one UE, e.g., as shown in FIG. 4B.

In one design, the second base station may obtain multiple position estimates for multiple UEs from the position information. In another design, the second base station may obtain multiple position estimates obtained at different times for a single UE from the position information. For both designs, the second base station may determine the position estimate for the first base station based on the multiple position estimates for the single or multiple UEs.

Figure 10:
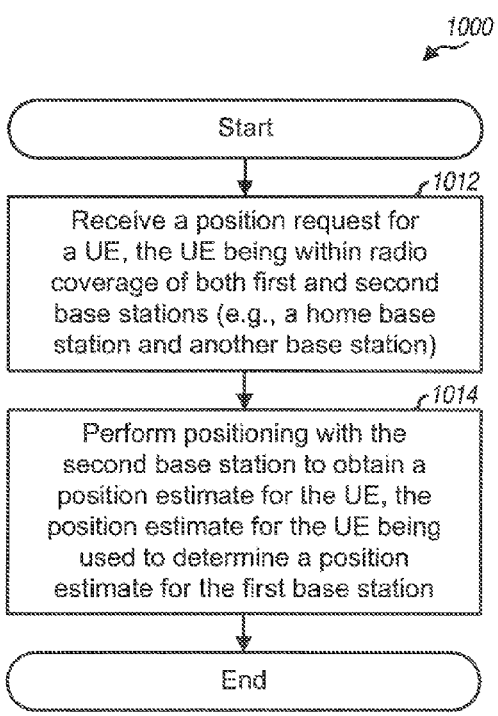
FIG. 10 shows a process performed by a UE to assist a base station with positioning.

FIG. 10 shows a design of a process 1000 to assist a network entity with positioning. Process 1000 may be performed by a UE for message flows such as those shown in FIGS. 2A to 4B. The UE may be within radio coverage of both first and second base stations and may receive a position request for its position, e.g., from the first or second base station (block 1012). The UE may be selected for positioning in various manners. In one design, the UE may detect the first base station and may send a measurement report identifying the first base station to the second base station. In another design, the first base station may detect the UE and may identify the UE to the second base station.

The UE may perform positioning with the second base station to obtain a position estimate for itself (block 1014). The position estimate for the UE may be used to determine a position estimate for the first base station. The UE may send its position estimate to the first or second base station, or the position estimate may be available at the first or second base station from the positioning. The UE may also exchange signaling with the first base station to obtain an RTT measurement. The position estimate for the first base station may then be determined further based on the RTT measurement.

The UE may subsequently receive a second request for its position and may performing positioning with the second base station to obtain a second position estimate for itself. The second position estimate for the UE may be used to determine the position estimate for the first base station.

Figure 11:
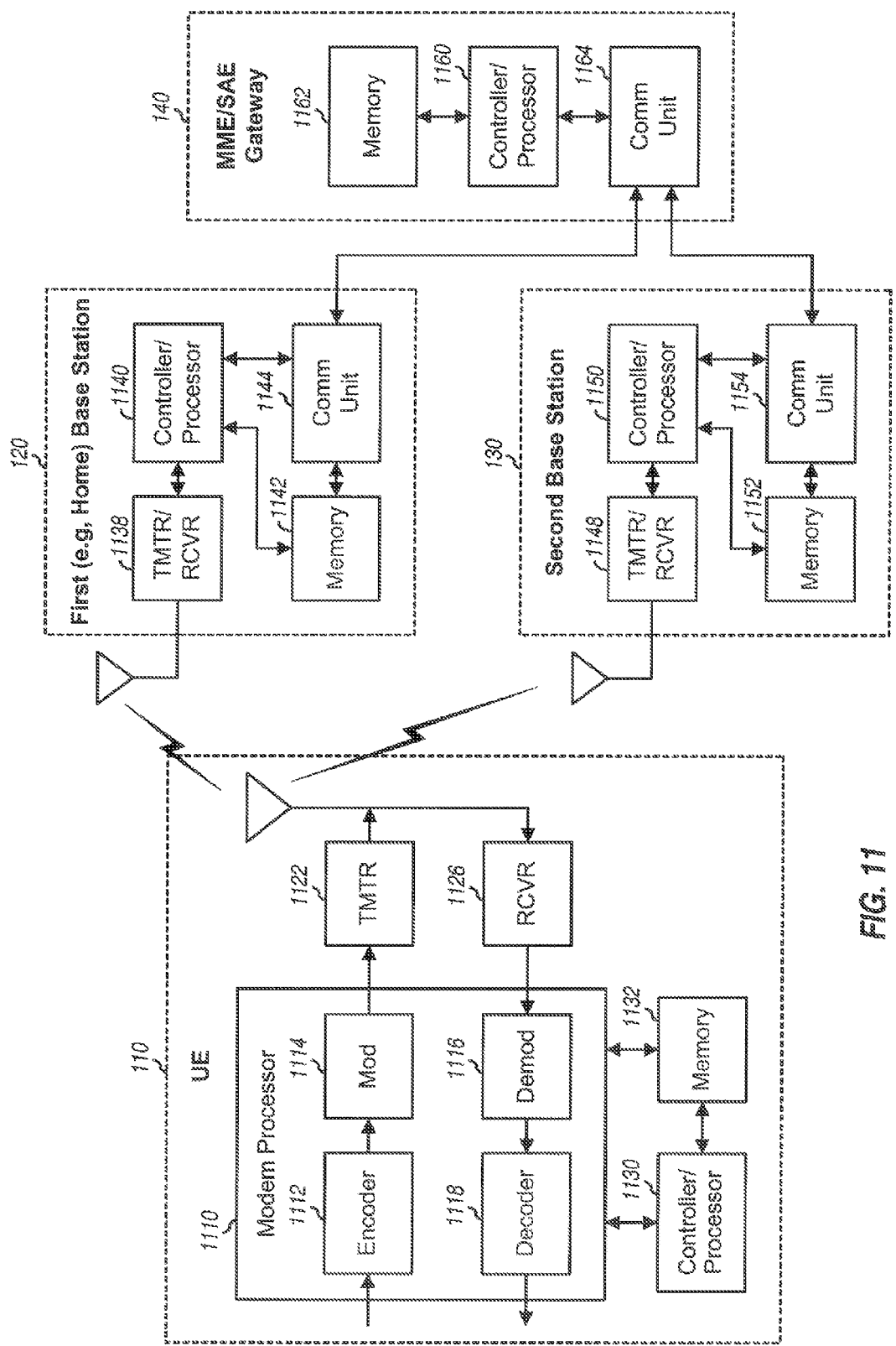
FIG. 11 shows a block diagram of the UE, the home base station, the second base station, and an MME/SAE gateway.

FIG. 11 shows a block diagram of a design of UE 110, first (e.g., home) base station 120, second base station 130, and MME/SAE gateway 140 in FIG. 1. On the uplink, at UE 110, an encoder 1112 may receive traffic data and signaling to be sent on the uplink and may process (e.g., format, encode, and interleave) the traffic data and signaling. A modulator (Mod) 1114 may further process (e.g., modulate, channelize, and scramble) the encoded traffic data and signaling and provide output samples. A transmitter (TMTR) 1122 may condition (e.g., convert to analog, filter, amplify, and frequency upconvert) the output samples and generate an uplink signal, which may be transmitted to base station 120 and/or 130.

On the downlink, UE 110 may receive downlink signals transmitted by base station 120 and/or 130. A receiver (RCVR) 1126 may condition (e.g., filter, amplify, frequency downconvert, and digitize) the received signal and provide input samples. A demodulator (Demod) 1116 may process (e.g., descramble, channelize, and demodulate) the input samples and provide symbol estimates. A decoder 1118 may process (e.g., deinterleave and decode) the symbol estimates and provide decoded data and signaling sent to UE 110. Encoder 1112, modulator 1114, demodulator 1116, and decoder 1118 may be implemented by a modem processor 1110. These units may perform processing in accordance with a radio technology (e.g., LTE) used by the cellular network. A controller/processor 1130 may direct the operation of various units at UE 110. Controller/processor 1130 may also perform or direct process 1000 in FIG. 10 and/or other processes for the techniques described herein. Memory 1132 may store program codes and data for UE 110.

At base station 120, a transmitter/receiver 1138 may support radio communication with UE 110 and other UEs. A controller/processor 1140 may perform various functions for communication with the UEs. For the uplink, the uplink signal from UE 110 may be received and conditioned by receiver 1138 and further processed by controller/processor 1140 to recover the traffic data and signaling sent by the UE. For the downlink, traffic data and signaling may be processed by controller/processor 1140 and conditioned by transmitter 1138 to generate a downlink signal, which may be transmitted to UE 110 and other UEs. Controller/processor 1140 may also perform, direct or participate in process 600 in FIG. 6, process 800 in FIG. 8, and/or other processes for the techniques described herein. Memory 1142 may store program codes and data for base station 120. A communication (Comm) unit 1144 may support communication with MME/SAE gateway 140 and/or other network entities.

At base station 130, a transmitter/receiver 1148 may support radio communication with UE 110 and other UEs. A controller/processor 1150 may perform various functions for communication with the UEs. Controller/processor 1150 may also perform, direct or participate in process 700 in FIG. 7, process 900 in FIG. 9, and/or other processes for the techniques described herein. Memory 1152 may store program codes and data for base station 130. A communication unit 1154 may support communication with MME/SAE gateway 140 and/or other network entities.

At MME/SAE gateway 140, a controller/processor 1160 may perform various functions to support communication services for the UEs. Memory 1162 may store program codes and data for MME/SAE gateway 140. A communication unit 1164 may support communication with the base stations and other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of performing positioning in a cellular communication network, comprising:
   sending at least one position request for at least one user equipment (UE) from a first base station to a second base station, the at least one UE being within radio coverage of both the first and second base stations, wherein the first base station provides restricted access to a specific group of UEs, wherein the first base station comprises a home base station providing radio coverage for a femto-cell, and wherein the second base station provides radio coverage for a macro-cell encompassing the femto-cell;
   receiving position information for the at least one UE from the second base station; and
   determining a position estimate for the first base station based on the position information for the at least one UE, wherein the determining the position estimate for the first base station comprises:
      obtaining multiple position estimates for the at least one UE from the position information, and
      averaging the multiple position estimates for the at least one UE to obtain the position estimate for the first base station.

2. The method of claim 1, wherein the determining the position estimate for the first base station comprises:
   obtaining multiple round trip time (RTT) measurements for the at least one UE,
   obtaining multiple position estimates for the at least one UE from the position information, and determining the position estimate for the first base station based on the multiple RTT measurements and the multiple position estimates for the at least one UE.

3. The method of claim 1, wherein the at least one UE comprises multiple UEs, wherein the position information comprises multiple position estimates for the multiple UEs, and wherein the position estimate for the first base station is determined based on the multiple position estimates for the multiple UEs.

4. The method of claim 1, wherein the at least one UE comprises a single UE, wherein the position information comprises multiple position estimates obtained at different times for the single UE, and wherein the position estimate for the first base station is determined based on the multiple position estimates for the single UE.

5. An apparatus for wireless communication, comprising:
at least one processor configured to execute instructions that cause the apparatus to:
send at least one position request for at least one user equipment (UE) from a first base station to a second base station, the at least one UE being within radio coverage of both the first and second base stations, to receive position information for the at least one UE from the second base station, and to determine a position estimate for the first base station based on the position information for the at least one UE, wherein the first base station provides restricted access to a specific group of UEs, wherein the first base station comprises a home base station providing radio coverage for a femto-cell, wherein the second base station provides radio coverage for a macro-cell encompassing the femto-cell, and wherein the at least one UE comprises a UE not authorized to access the femto-cell,
wherein the at least one processor is further configured to execute instructions that cause the apparatus to obtain multiple position estimates for the at least one UE from the position information, and to average the multiple position estimates for the at least one UE to obtain the position estimate for the first base station, and
a memory coupled to the at least one processor storing the instructions.

6. The apparatus of claim 5, wherein the at least one processor is further configured to execute instructions that cause the apparatus to obtain multiple round trip time (RTT) measurements for the at least one UE, to obtain multiple position estimates for the at least one UE from the position information, and to determine the position estimate for the first base station based on the multiple RTT measurements and the multiple position estimates for the at least one UE.

7. An apparatus for performing positioning in a cellular communication network, comprising:
means for sending at least one position request for at least one user equipment (UE) from a first base station to a second base station, the at least one UE being within radio coverage of both the first and second base stations, wherein the first base station provides restricted access to a specific group of UEs, wherein the first base station comprises a home base station providing radio coverage for a femto-cell, and wherein the second base station provides radio coverage for a macro-cell encompassing the femto-cell;
means for receiving position information for the at least one UE from the second base station; and
means for determining a position estimate for the first base station based on the position information for the at least one UE,
wherein the means for determining the position estimate for the first base station comprises:
means for obtaining multiple position estimates for the at least one UE from the position information, and
means for averaging the multiple position estimates for the at least one UE to obtain the position estimate for the first base station.

8. The apparatus of claim 7, wherein the means for determining the position estimate for the first base station comprises
means for obtaining multiple round trip time (RTT) measurements for the at least one UE,
means for obtaining multiple position estimates for the at least one UE from the position information, and
means for determining the position estimate for the first base station based on the multiple RTT measurements and the multiple position estimates for the at least one UE.

9. A computer program product, comprising:
a non-transitory computer-readable medium comprising:
code for causing at least one computer to send at least one position request for at least one user equipment (UE) from a first base station to a second base station, the at least one UE being within radio coverage of both the first and second base stations, wherein the first base station provides restricted access to a specific group of UEs, wherein the first base station comprises a home base station providing radio coverage for a femto-cell, and wherein the second base station provides radio coverage for a macro-cell encompassing the femto-cell;
code for causing the at least one computer to receive position information for the at least one UE from the second base station; and
code for causing the at least one computer to determine a position estimate for the first base station based on the position information for the at least one UE,
wherein the code for causing the at least one computer to determine the position estimate for the first base station comprises:
code for causing the at least one computer to obtain multiple position estimates for the at least one UE from the position information, and
code for causing the at least one computer to average the multiple position estimates for the at least one UE to obtain the position estimate for the first base station.

10. The computer program product of claim 9, the computer-readable medium further comprising:
code for causing the at least one computer to obtain multiple round trip time (RTT) measurements for the at least one UE,
code for causing the at least one computer to obtain multiple position estimates for the at least one UE from the position information, and
code for causing the at least one computer to determine the position estimate for the first base station based on the multiple RTT measurements and the multiple position estimates for the at least one UE.

11. A method of performing positioning in a cellular communication network, comprising:
receiving a position request for a first base station at a second base station, wherein the first base station provides restricted access to a specific group of UEs, wherein the first base station comprises a home base station providing radio coverage for a femto-cell, wherein the second base station provides radio coverage for a macro-cell encompassing the femto-cell;
obtaining position information for at least one user equipment (UE) within radio coverage of both the first and second base stations;
determining a position estimate for the first base station based on the position information for the at least one UE; and
sending the position estimate to the first base station,
wherein the determining the position estimate for the first base station comprises
obtaining multiple position estimates for the at least one UE from the position information, and
averaging the multiple position estimates for the at least one UE to obtain the position estimate for the first base station.

12. The method of claim 11, wherein the determining the position estimate for the first base station comprises
obtaining multiple round trip time (RTT) measurements for the at least one UE, obtaining multiple position estimates for the at least one UE from the position information, and
determining the position estimate for the first base station based on the multiple RTT measurements and the multiple position estimates for the at least one UE.

13. A method of performing positioning in a cellular communication network, comprising:
receiving a position request for a first base station at a second base station, wherein the first base station provides restricted access to a specific group of UEs, wherein the first base station comprises a home base station providing radio coverage for a femto-cell, wherein the second base station provides radio coverage for a macro-cell encompassing the femto-cell;
obtaining position information for at least one user equipment (UE) within radio coverage of both the first and second base stations;
determining a position estimate for the first base station based on the position information for the at least one UE; and
sending the position estimate to the first base station,
wherein the determining the position estimate for the first base station comprises:
obtaining multiple round trip time (RTT) measurements for the at least one UE,
obtaining multiple position estimates for the at least one UE from the position information, and
determining the position estimate for the first base station based on the multiple RTT measurements and the multiple position estimates for the at least one UE,
wherein the obtaining the multiple RTT measurements for the at least one UE comprises:
sending at least one RTT request to the first base station, and
receiving the multiple RTT measurements for the at least one UE from the first base station.

14. The method of claim 12, wherein the obtaining the multiple RTT measurements for the at least one UE comprises receiving the multiple RTT measurements from the at least one UE.

15. The method of claim 11, further comprising:
receiving a list of UE's that includes the at least one UE from the first base station.

16. The method of claim 11, further comprising:
identifying the at least one UE based on measurement reports received from the at least one UE.

17. The method of claim 11, wherein the at least one UE comprises multiple UEs, wherein the position information comprises multiple position estimates for the multiple UEs, and wherein the position estimate for the first base station is determined based on the multiple position estimates for the multiple UEs.

18. The method of claim 11, wherein the at least one UE comprises a single UE, wherein the position information comprises multiple position estimates obtained at different times for the single UE, and wherein the position estimate for the first base station is determined based on the multiple position estimates for the single UE.

19. The method of claim 11, wherein the obtaining the position information for the at least one UE and the determining the position estimate for the first base station are performed prior to the receiving the position request for the first base station, and wherein the sending the position estimate to the first base station is performed in response to receiving the position request.

20. The method of claim 11, further comprising:
maintaining a database of position estimates for multiple base stations comprising the first base station; and
updating the position estimates for the multiple base stations when position estimates for UEs within radio coverage of the multiple base stations become available.

21. An apparatus for wireless communication, comprising:
at least one processor configured to execute instructions that cause the apparatus to receive a position request for a first base station at a second base station, to obtain position information for at least one user equipment (UE) within radio coverage of both the first and second base stations, to determine a position estimate for the first base station based on the position information for the at least one UE, and to send the position estimate to the first base station, wherein the first base station provides restricted access to a specific group of UEs, wherein the first base station comprises a home base station providing radio coverage for a femto-cell, wherein the second base station provides radio coverage for a macro-cell encompassing the femto-cell, and wherein the at least one UE comprises a UE not authorized to access the femto-cell,
wherein the at least one processor is further configured to execute instructions that cause the apparatus to determine the position estimate for the first base station by obtaining multiple position estimates for the at least one UE from the position information, and averaging the multiple position estimates for the at least one UE to obtain the position estimate for the first base station, and
a memory coupled to the at least one processor storing the instructions.

22. The apparatus of claim 21, wherein the at least one processor is further configured to execute instructions that cause the apparatus to obtain multiple round trip time (RTT) measurements for the at least one UE, to obtain multiple position estimates for the at least one UE from the position information, and to determine the position estimate for the first base station based on the multiple RTT measurements and the multiple position estimates for the at least one UE.

23. The apparatus of claim 22, wherein the at least one processor is further configured to execute instructions that cause the apparatus to send at least one RTT request to the first base station and to receive the multiple RTT measurements for the at least one UE from the first base station.

24. The method of claim 1, wherein the at least one UE is capable of exchanging lower-level signaling useful for positioning, with the first base station.

25. An apparatus for performing positioning in a cellular communication network, comprising:
- means for receiving a position request for a first base station at a second base station, wherein the first base station provides restricted access to a specific group of UEs, wherein the first base station comprises a home base station providing radio coverage for a femto-cell, wherein the second base station provides radio coverage for a macro-cell encompassing the femto-cell;
- means for obtaining position information for at least one user equipment (UE) within radio coverage of both the first and second base stations;
- means for determining a position estimate for the first base station based on the position information for the at least one UE; and
- means for sending the position estimate to the first base station,
- wherein the means for determining the position estimate for the first base station is configured to:
  - obtain multiple position estimates for the at least one UE from the position information, and
  - average the multiple position estimates for the at least one UE to obtain the position estimate for the first base station.

26. A computer program product, comprising:
a non-transitory computer-readable medium comprising:
- code for causing at least one computer to receive a position request for a first base station at a second base station, wherein the first base station provides restricted access to a specific group of UEs, wherein the first base station comprises a home base station providing radio coverage for a femto-cell, wherein the second base station provides radio coverage for a macro-cell encompassing the femto-cell;
- code for causing the at least one computer to obtain position information for at least one user equipment (UE) within radio coverage of both the first and second base stations;
- code for causing the at least one computer to determine a position estimate for the first base station based on the position information for the at least one UE; and
- code for causing the at least one computer to send the position estimate to the first base station,
- wherein the code for causing the at least one computer to determine the position estimate for the first base station comprises:
  - code for causing the at least one computer to obtain multiple position estimates for the at least one UE from the position information, and
  - code for causing the at least one computer to average the multiple position estimates for the at least one UE to obtain the position estimate for the first base station.

27. An apparatus for performing positioning in a cellular communication network, comprising:
- means for receiving a position request for a first base station at a second base station, wherein the first base station provides restricted access to a specific group of UEs, wherein the first base station comprises a home base station providing radio coverage for a femto-cell, wherein the second base station provides radio coverage for a macro-cell encompassing the femto-cell;
- means for obtaining position information for at least one user equipment (UE) within radio coverage of both the first and second base stations;
- means for determining a position estimate for the first base station based on the position information for the at least one UE; and
- means for sending the position estimate to the first base station,
- wherein the means for determining the position estimate for the first base station is configured to:
  - obtain multiple round trip time (RTT) measurements for the at least one UE,
  - obtain multiple position estimates for the at least one UE from the position information, and
  - determine the position estimate for the first base station based on the multiple RTT measurements and the multiple position estimates for the at least one UE,
  - wherein the means for determining is configured to obtain the multiple RTT measurements for the at least one UE by:
    - sending at least one RTT request to the first base station, and
    - receiving the multiple RTT measurements for the at least one UE from the first base station.

28. A computer program product, comprising:
a non-transitory computer-readable medium comprising:
- code for code for causing at least one computer to receive a position request for a first base station at a second base station, wherein the first base station provides restricted access to a specific group of UEs, wherein the first base station comprises a home base station providing radio coverage for a femto-cell, wherein the second base station provides radio coverage for a macro-cell encompassing the femto-cell;
- code for causing the at least one computer to obtain position information for at least one user equipment (UE) within radio coverage of both the first and second base stations;
- code for causing the at least one computer to determine a position estimate for the first base station based on the position information for the at least one UE; and
- code for causing the at least one computer to send the position estimate to the first base station,
- wherein the code for causing the at least one computer to determine the position estimate for the first base station comprises:
  - code for causing the at least one computer to obtain multiple round trip time (RTT) measurements for the at least one UE,
  - code for causing the at least one computer to obtain multiple position estimates for the at least one UE from the position information, and
  - code for causing the at least one computer to determine the position estimate for the first base station based on the multiple RTT measurements and the multiple position estimates for the at least one UE,
  - wherein the code for causing the at least one computer to obtain the multiple RTT measurements for the at least one UE comprises:
    - code for causing the at least one computer to send at least one RTT request to the first base station, and
    - code for causing the at least one computer to receive the multiple RTT measurements for the at least one UE from the first base station.

29. An apparatus for performing positioning in a cellular communication network, comprising:
at least one processor configured to execute instructions that cause the apparatus to:
- receive a position request for a first base station at a second base station, wherein the first base station provides restricted access to a specific group of UEs, wherein the first base station comprises a home base station providing radio coverage for a femto-cell, wherein the second base station provides radio coverage for a macro-cell encompassing the femto-cell;

obtain position information for at least one user equipment (UE) within radio coverage of both the first and second base stations;

determine a position estimate for the first base station based on the position information for the at least one UE; and send the position estimate to the first base station, wherein the at least one processor is further configured to execute instructions that cause the apparatus to determine the position estimate for the first base station by:

obtaining multiple round trip time (RTT) measurements for the at least one UE, obtaining multiple position estimates for the at least one UE from the position information, and determining the position estimate for the first base station based on the multiple RTT measurements and the multiple position estimates for the at least one UE, wherein the at least one processor is configured execute instructions that cause the apparatus to obtain the multiple RTT measurements for the at least one UE by:

sending at least one RTT request to the first base station, and receiving the multiple RTT measurements for the at least one UE from the first base station; and memory coupled to the at least one processor for storing the instructions.

* * * * *